United States Patent [19]
Ayora

[11] 3,889,655
[45] June 17, 1975

[54] CONTAINER FOR BOILING MILK

[76] Inventor: David Enrique Ayora, Roque Saenz Pena 4445, Buenos Aires, Argentina

[22] Filed: Apr. 19, 1974

[21] Appl. No.: 462,571

[52] U.S. Cl. .................. 126/387; 126/390; 99/403; 99/406
[51] Int. Cl. ........................................... A47j 27/00
[58] Field of Search ...... 126/387, 390; 99/403, 406; 165/185

[56] References Cited
UNITED STATES PATENTS

| | | | |
|---|---|---|---|
| 1,287,318 | 12/1918 | Horvath | 126/390 |
| 1,907,265 | 5/1933 | Schwedersky | 126/387 |
| 2,008,805 | 7/1935 | Van Buuren | 126/387 |
| 2,909,172 | 10/1959 | Caniglia | 126/387 |

*Primary Examiner*—Kenneth W. Sprague
*Assistant Examiner*—Larry I. Schwartz
*Attorney, Agent, or Firm*—Robert E. Burns; Emmanuel J. Lobato; Bruce L. Adams

[57] ABSTRACT

A container for boiling milk has a vertical cylindrical wall and a base divided into upper and lower flat walls staggered with respect to one another. An intermediate upright wall interconnects the upper and lower flat walls. A metal bottom disc is provided below, and in surface contact with, the lower flat wall, closing the bottom of the container and thereby defining a cooling space below the upper flat wall of the base. Several cooling plates, parallel to one another and to the base walls, are provided in this cooling space. They prevent boiling over of milk, brought to boiling temperature on the lower flat wall.

5 Claims, 4 Drawing Figures

CONTAINER FOR BOILING MILK

BACKGROUND OF THE INVENTION

The invention set forth herein refers to a new device for boiling milk.

Milk decomposes easily; therefore, it should undergo several sterilizing processes so that it can be kept in adequate condition for consumption. In spite of being a pasteurized product, it has to be boiled in order to ensure this condition. This is apparently an easy process; however, housewives have to be constantly looking after the boiling process to prevent the milk from spilling and from causing the consequent inconveniencies. When interrupting the boiling process by withdrawing the milk from the heat source, the sterilizing process is discontinued and it will only be possible to complete said process after a longer period even if spilling is avoided as the temperatures in this case do not reach those of intense boiling, i.e. 120° –130°. Housewives usually withdraw the container from the fire or leave only half the base under the direct action of heat, allowing in this way a soft boiling of the milk to prevent it from spilling. All bacteria that did not disappear in the first ebullition will surely be destroyed in this second process.

OBJECTS AND NATURE OF THE INVENTION

It is a basic object of the invention to provide the problems formerly encounted, particularly without a new device which allows the milk to be boiled without spilling and without losing its properties during the time required to destroy the germs.

This container may have any shape, but it will preferably have a cylindrical wall, as is used in the case of standard boilers. The new container has a base divided into two parallel, flat walls; a lower wall that is in direct contact with the heat source and an upper one that is separated from that first one; this allows a free space between said heat source and the other part of the boiler base.

Said space contains at least two plates that are equally separated from each other and are parallel to the base; in this way, the system provides a cooling zone that diminishes the heat input. The applied heat directly and strongly affects one of the two flat walls of the base and the other surface does not receive such strong heat input. In this way, the liquid inside the boiler heats by means of the action exerted on the first base and in a very slight manner by the one on the second flat wall. However, there will be a homogenous heating of the contents. This is due to the fact that the thermosiphon physical laws provide a constant circulation of the liquid as a result of the variation of density that occurs when one part of the volume is heated and the other one is cooled. In this way, it is possible to establish a heat input for soft boiling; this boiling can be maintained avoiding danger of spilling the milk and it will be possible to attain a perfect sterilization, by a single somewhat prolonged boiling process.

Figure 1:
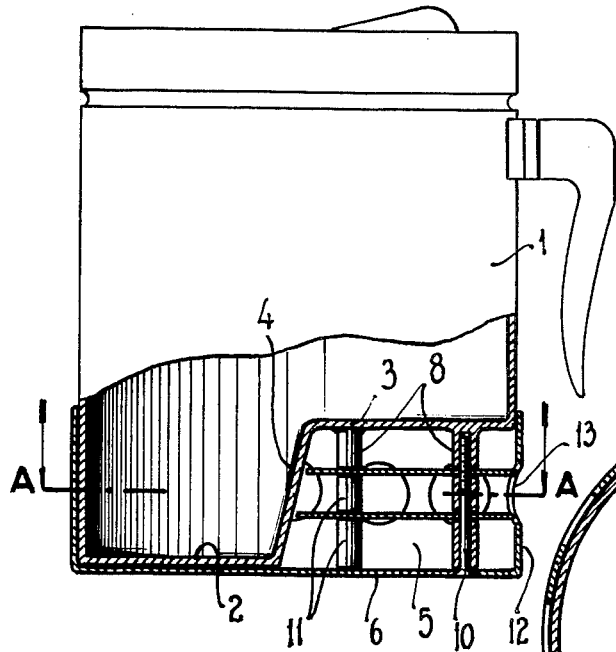
FIG. 1 shows an elevation view of the boiling container, partly in central, vertical section.
Figure 2:
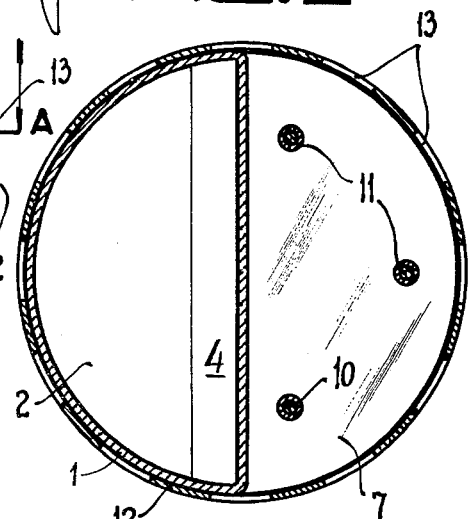
FIG. 2 is a sectional the view taken along the line A—A of FIG. 1.
Figure 3:
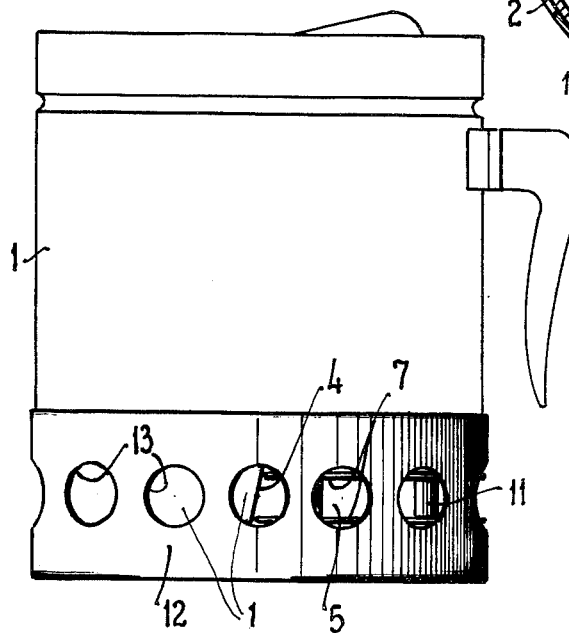
FIG. 3 shows an elevational the outside view of the new boiling container.
Figure 4:
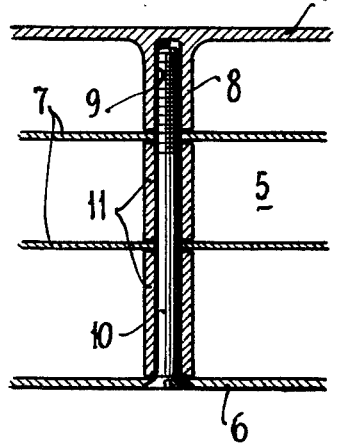
FIG. 4 shows a detail from FIG. 1.

The container 1, as shown, has a generally vertical, generally cylindrical wall. It has a base which comprises two mutually parallel staggered flat walls 2, 3 interconnected by an intermediate upright wall 4. This construction provides a generally semicylindrical cooling space 5 above the plane of the lower flat wallll 2, laterally of the upright wall 4, and below the upper flat wall 3. As further shown a disc 6 closes the underside of cooling space 5 and is in surface contact with the underside of lower flat wall 2. Cooling plates 7 are disposed in cooling space 5. They are shown in FIG. 4 as generally semicircular, horizontal plates supported by hollow bosses 8 and with sleeves 11 interposed between mutually superposed plates 7 and between the lowermost plate 7 and disc 6.

To offer a more aesthetic presentation of the unit, a metal band 12 is applied all around the base of the container 1. The band is shown as cylindrical flange of the disc 6. Said band has holes 13, some of which are give access to space 5 and provide ventilation for the cooling plates 7.

By using this system it unnecessary to separate the boiler from the heat source and to keep only half its base on a slow fire. It becomes possible to place the container directly on the fire and to keep it there until the boiling of milk has been completed. The heat will act directly on the disc 6 and therefore, against the lower flat wall 2 and the liquid accumulated in this part will receive the full intensity of the heat. The other part of the disc 6 will also receive the same amount of heat, but it will convey it to the space 5 Heat is dissipated in this space, by the cooling plates 7, thereby establishing low temperature in the upper flat wall 3 and the upright wall 4. In this way, the milk will boil smoothly at a constant temperature due to the thermosiphon effect mentioned hereinbefore. This process can continue until an effective sterilization has been reached at and due to this new system there is no danger of spilling the milk.

The scope of the invention is not limited to the details of the preferred embodiment shown and described herein.

What is claimed is:

1. Apparatus for boiling milk, comprising; a container having a generally vertical, generally cylindrical wall; a lower flat base wall disposed in a lower part of the container; an upper flat base wall parallel to the lower one and in a position staggered with respect to the same; an intermediate upright wall interconnecting the lower and upper flat walls and cooperating with them to close a lower part of the container; a metal bottom disc below and in surface contact with the lower flat wall and defining with the upper flat wall a cooling space in the lower part of the container; and a plurality of cooling plates mounted in said cooling space; whereby milk can be heated for boiling through said disc and said lower flat wall while being relatively cooled by said upper flat wall and said cooling plates in said cooling space to avoid boiling over of the milk.

2. Apparatus according to claim 1 wherein the cooling plates are horizontal, semicircular, vertically spaced from and parallel to one another and secured to the upper flat wall and the bottom disc in parallel relation thereto.

3. Apparatus according to claim 2 including elongate bolts each securing the several cooling plates to the bottom disc and the upper flat wall, and sleeve means surrounding said bolts near and between said cooling plates to keep said cooling plates apart from one another and from the upper flat wall and the bottom disc.

4. Apparatus according to claim 1 wherein said bottom disc has a generally cylindrical flange secured to said generally cylindrical wall of the container.

5. Apparatus according to claim 4 wherein said flange has apertures providing ventilation for said cooling space.

* * * * *